US010505473B2

(12) United States Patent
Takano et al.

(10) Patent No.: US 10,505,473 B2
(45) Date of Patent: Dec. 10, 2019

(54) ELECTRIC TOOL

(71) Applicant: HITACHI KOKI CO., LTD., Tokyo (JP)

(72) Inventors: Nobuhiro Takano, Ibaraki (JP); Kazutaka Iwata, Ibaraki (JP); Toshiaki Koizumi, Ibaraki (JP); Naoki Tadokoro, Ibaraki (JP); Hiroshi Haga, Ibaraki (JP); Shinichirou Satou, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 384 days.

(21) Appl. No.: 15/123,074

(22) PCT Filed: Mar. 25, 2015

(86) PCT No.: PCT/JP2015/060303
§ 371 (c)(1),
(2) Date: Sep. 1, 2016

(87) PCT Pub. No.: WO2015/147331
PCT Pub. Date: Oct. 1, 2015

(65) Prior Publication Data
US 2017/0070168 A1 Mar. 9, 2017

(30) Foreign Application Priority Data

Mar. 28, 2014 (JP) .................. 2014-070587

(51) Int. Cl.
*H02P 6/16* (2016.01)
*B25F 5/00* (2006.01)
*H02P 27/08* (2006.01)

(52) U.S. Cl.
CPC .................. *H02P 6/16* (2013.01); *B25F 5/00* (2013.01); *H02P 27/08* (2013.01)

(58) Field of Classification Search
CPC .... B25F 5/00; B25F 5/008; H02P 6/08; H02P 7/29; H02P 27/08; H02P 29/032; H02P 6/18; H02P 8/12; H02P 27/06; H02P 6/16
(Continued)

(56) References Cited

U.S. PATENT DOCUMENTS 5,757,162 A * 5/1998 Weber .................... H02P 25/04
318/531
6,087,815 A 7/2000 Pfeifer et al.
(Continued)

FOREIGN PATENT DOCUMENTS

CN 101372095 A 2/2009
CN 101391416 A 3/2009
(Continued)

OTHER PUBLICATIONS

International Search Report and Written Opinion of the International Search Report for PCT/JP2015/060303 dated Aug. 28, 2015.
(Continued)

*Primary Examiner* — Robert F Long
(74) *Attorney, Agent, or Firm* — Kenealy Vaidya LLP

(57) ABSTRACT

An electric tool including a motor configured to be driven by a PWM control of a semiconductor switching element by using a power supply, a power transmission mechanism configured to transmit a rotation of the motor to an end tool, and a controller configured to control a rotation of the motor by a duty ratio of a PWM signal, wherein the controller is configured to set the duty ratio to a reference duty ratio less than 100% when a voltage of the power supply applied to the electric tool is within a predetermined range including a rated voltage of the electric tool, and wherein the controller is configured to drive the motor by setting the duty ratio to
(Continued)

be higher than the reference duty ratio when the voltage of the power supply applied to the electric tool is lower than the predetermined range.

11 Claims, 10 Drawing Sheets

(58) Field of Classification Search
USPC ............. 173/1–2, 4–8, 11, 18, 29, 170, 176, 173/180–181, 217
See application file for complete search history.

(56) References Cited

U.S. PATENT DOCUMENTS

| | | | | |
|---|---|---|---|---|
| 6,608,401 | B1* | 8/2003 | Walter | H02M 5/458 307/18 |
| 8,179,069 | B2* | 5/2012 | Matsunaga | H02P 6/08 318/434 |
| 2003/0020642 | A1* | 1/2003 | Ely | G01D 5/244 341/111 |
| 2003/0121685 | A1* | 7/2003 | Yamamoto | B25B 21/00 173/217 |
| 2003/0155813 | A1* | 8/2003 | Walter | H02M 5/458 307/31 |
| 2007/0257084 | A1* | 11/2007 | Carrier | B23K 9/10 228/44.3 |
| 2009/0051306 | A1 | 2/2009 | Matsunaga et al. | |
| 2009/0096401 | A1 | 4/2009 | Watabe et al. | |
| 2009/0242284 | A1* | 10/2009 | Whetstone, Jr. | B62B 5/0026 180/19.2 |
| 2010/0071920 | A1* | 3/2010 | Lau | B25F 5/00 173/1 |
| 2010/0288814 | A1* | 11/2010 | Higuchi | B27F 7/19 227/82 |
| 2010/0308764 | A1 | 12/2010 | Suzuki et al. | |
| 2011/0284256 | A1* | 11/2011 | Iwata | B25F 5/00 173/176 |
| 2011/0315417 | A1* | 12/2011 | Matsunaga | B25B 21/008 173/176 |
| 2012/0068633 | A1* | 3/2012 | Watanabe | B25F 5/001 318/3 |
| 2013/0014967 | A1 | 1/2013 | Ito et al. | |
| 2013/0126202 | A1* | 5/2013 | Oomori | B25B 21/00 173/217 |
| 2013/0133911 | A1* | 5/2013 | Ishikawa | B25B 21/00 173/176 |
| 2014/0001993 | A1 | 1/2014 | Iwata et al. | |
| 2015/0022125 | A1 | 1/2015 | Takano et al. | |
| 2015/0034348 | A1* | 2/2015 | Yoshida | B24B 23/028 173/176 |
| 2015/0042246 | A1 | 2/2015 | Tadokoro et al. | |
| 2015/0135907 | A1* | 5/2015 | Hirabayashi | B23Q 5/048 81/54 |
| 2016/0008961 | A1* | 1/2016 | Takano | B25B 21/02 173/2 |
| 2016/0111984 | A1* | 4/2016 | Koizumi | B25F 5/00 318/400.22 |
| 2016/0193673 | A1* | 7/2016 | Yoshida | B23D 47/12 30/388 |
| 2016/0197573 | A1 | 7/2016 | Iwata et al. | |
| 2016/0354905 | A1* | 12/2016 | Ely | B25B 21/008 |

FOREIGN PATENT DOCUMENTS

| | | |
|---|---|---|
| CN | 101911468 A | 12/2010 |
| CN | 102770248 A | 11/2012 |
| CN | 103684149 A | 3/2014 |
| EP | 2 713 474 A2 | 4/2014 |
| JP | 11-179672 A | 7/1999 |
| JP | 2005-278375 A | 10/2005 |
| JP | 2011-148069 A | 8/2011 |
| JP | 2012-196723 A | 10/2012 |
| JP | 2013-188850 A | 9/2013 |
| JP | 2013-202774 A | 10/2013 |
| WO | 2012/127851 A2 | 9/2012 |
| WO | 2013/137480 A2 | 9/2013 |
| WO | 2013/147323 A2 | 10/2013 |

OTHER PUBLICATIONS

Japanese Office Action for the related Japanese Patent Application No. 2017-079674 dated May 29, 2018.
Chinese Office Action for the related Chinese Patent Application No. 201580012174.2 dated Jun. 4, 2018.

* cited by examiner

FIG. 5A

| V0 | D0 |
|---|---|
| ≥225V | 86% |
| <225V | 88% |

FIG. 5B

| V1 | D1 |
|---|---|
| ≥225V | 86% |
| <225V、≥220V | 88% |
| <225V | 90% |

ELECTRIC TOOL

This application is a U.S. national phase filing under 35 U.S.C. § 371 of PCT Application No. PCT/JP2015/060303, filed Mar. 25, 2015, and which in turn claims priority under 35 U.S.C. § 119 to Japanese Patent Application No. JP2014-070587, filed Mar. 28, 2014, the entireties of which are incorporated by reference herein.

TECHNICAL FIELD

Aspects of the present invention relate to an electric tool using an electric motor as a power source. More specifically, the aspects of the present invention relate to an improved electric tool where a motor can be operated at a predetermined rotation number and torque even when an input voltage from an AC power supply is varied.

BACKGROUND ART

As a drive source of an electric tool for driving an end tool, an electric motor using AC power is widely used, as disclosed in JP-A-2011-148069. In the case of the electric motor using the AC power, compared to an electric tool using a DC motor with a battery, an output is high, and further, a long time operation is possible. On the other hand, when using the AC power, it is required to connect a power supply cord to a socket. Accordingly, available locations may be limited, compared to a portable electric tool with a battery. When the electric tool using the AC power is used in a location with no socket, an extension cord 104 wound around a cord reel 103 is often used to supply power from a socket 105 to an electric tool 101, as shown in FIG. 10. In this case, the cord reel 103 is placed within a range where a power supply cord 102 extending from the electric tool 101 can be connected. When observing an actual using site, the extension cord 104 having a length of approximately 100 m or more is often used.

SUMMARY OF INVENTION

Technical Problem

When the power supply cord 102 is connected to the socket 105 through the long extension cord 104 as in the related art, in addition to the factors of instability of commercial power supply voltage supplied to the socket 105, the influence of the voltage drop due to the extension cord 104 cannot be ignored. Accordingly, there is a problem that the torque or rotation number of the motor of the electric tool 101 becomes lower than a rated output. For example, in a case where the commercial power supply of 230V is used and the extension cord 104 of 100 m having a cross-section area of 2 mm$^2$ and an AC conductor resistance of 11.8 Ω/km is used, the voltage drop of approximately 11.8 V is caused when current is 10 A. Accordingly, the voltage inputted to the electric tool 101 is dropped more than 5%, compared to the rated 230 V. As the length of the power supply cord used becomes longer, the voltage drop due to the extension cord 104 is further increased. Further, the output variation of the electric tool 101 is increased in a circumstance where the voltage of the commercial power supply itself is unstable. Even in a configuration that the battery is not directly connected to the electric tool but connected to the electric tool through a cord, the electric tool is affected by the voltage drop due to the cord.

Aspects of the present invention has been made in consideration of the above situations and an object thereof is to provide an electric tool that is capable of maintaining the rated output even when the voltage variation in the power inputted to the electric tool occurs to some extent.

Another object is to provide an electric tool that can be operated in the rated output even when the voltage drop due to the usage of an extension cord occurs, by controlling the duty ratio of a motor to a value less than 100% when the rated power is inputted.

Another object of the present invention is to provide an electric tool that is capable of realizing the motor control that is strong to the input voltage variation of the power without an increase in manufacturing cost.

Solution to Problem

Aspects of the present invention are as follows:

According to an aspect of the present invention, there is provided an electric tool including: a motor configured to be driven by a PWM control of a semiconductor switching element by using a power supply; a power transmission mechanism configured to transmit a rotation of the motor to an end tool so as to drive the end tool; and a controller configured to control a rotation of the motor by a duty ratio of a PWM signal of the PWM control, wherein the controller is configured to set the duty ratio to a reference duty ratio less than 100%, when a voltage of the power supply applied to the electric tool is within a predetermined range including a rated voltage of the electric tool, and wherein the controller is configured to drive the motor by setting the duty ratio to be higher than the reference duty ratio, when the voltage of the power supply applied to the electric tool is lower than the predetermined range including the rated voltage.

In the above electric tool, the power supply may be an AC power supply supplied from the outside through a power supply cord, a rectifier circuit configured to rectify the AC power supply may be provided in a housing of the electric tool, and a brushless DC motor configured to be driven by using an inverter circuit may be used as the motor.

In the above electric tool, the reference duty ratio may be less than 90%, and the controller may drive the motor by increasing the duty ratio when the voltage of the power supply applied to the electric tool is lower than the rated voltage, the upper limit of the increased duty ratio being 100%.

In the above electric tool, the controller may set the duty ratio to be higher than the reference duty ratio when a potential difference between a first voltage of the power supply applied to the electric tool before the start of the motor and a second voltage of the power supply applied to the electric tool after the start of the motor has become large.

In the above electric tool, the controller may determine the duty ratio from the second voltage within a predetermined time immediately after a trigger of a switch for rotating the motor has been pulled.

In the above electric tool, the controller may drive the motor by increasing the duty ratio when the second voltage has decreased during the rotation of the motor.

In the above electric tool, the controller may drive the motor in a state where the duty ratio, which has been determined by using the second voltage immediately after the pulling of the trigger, is fixed until the trigger is returned.

The above electric tool may further include a rotation number setting unit configured to set a maximum rotation number of the motor to a plurality of levels, and the duty ratio may be set to a plurality of steps within a range between 0 and the reference duty ratio, in proportion to the set levels of the rotation number.

According to another aspect of the present invention, there is provided an electric tool including a motor configured to be driven by a PWM control of a semiconductor switching element by using a power supply; a power transmission mechanism configured to transmit a rotation of the motor to an end tool so as to drive the end tool; and a controller configured to control a rotation of the motor by a duty ratio of a PWM signal of the PWM control, wherein the controller is configured to set the duty ratio before the start of the motor to be less than 100%, and wherein the controller is configured to increase the duty ratio when a voltage of the power supply applied to the electric tool becomes lower than a rated voltage of the electric tool after the start of the motor.

According to another aspect of the present invention, there is provided an electric tool including a motor configured to be driven by a PWM control of a semiconductor switching element by using a power supply; a power transmission mechanism configured to transmit a rotation of the motor to an end tool so as to drive the end tool; and a controller configured to control a rotation of the motor by a duty ratio of a PWM signal of the PWM control, wherein the controller is configured to set the duty ratio before the start of the motor to be less than 100%, and wherein the controller is configured to drive the motor in a duty ratio higher than a previous duty ratio when a voltage of the power supply applied to the electric tool after the start of the motor becomes lower than a voltage of the power supply before the start of the motor.

In the above electric tool, the voltage of the power supply may be applied to the electric tool through a power supply cord, and a state of the motor before the start may refer to a state before current flows through the motor, and a state of the motor after the start may refer to a state where current flows through the motor.

Advantageous Effects of Invention

According to the present invention, it is possible to realize an electric tool where a decrease in a torque or rotation number of a motor can be suppressed and a stable operation can be performed even when the power supply is unstable and thus the voltage variation occurs or even when the voltage drop occurs due to the usage of a cord reel or a power cable, etc.

The foregoing and other objects and features of the present invention will be apparent from the detailed description below and accompanying drawings.

BRIEF DESCRIPTION OF DRAWINGS

FIGS. 5A and 5B are diagrams for explaining a relationship between a set duty ratio, and no-load input voltage V0 and load voltage V1;

DESCRIPTION OF EMBODIMENT

First Embodiment

Figure 1:
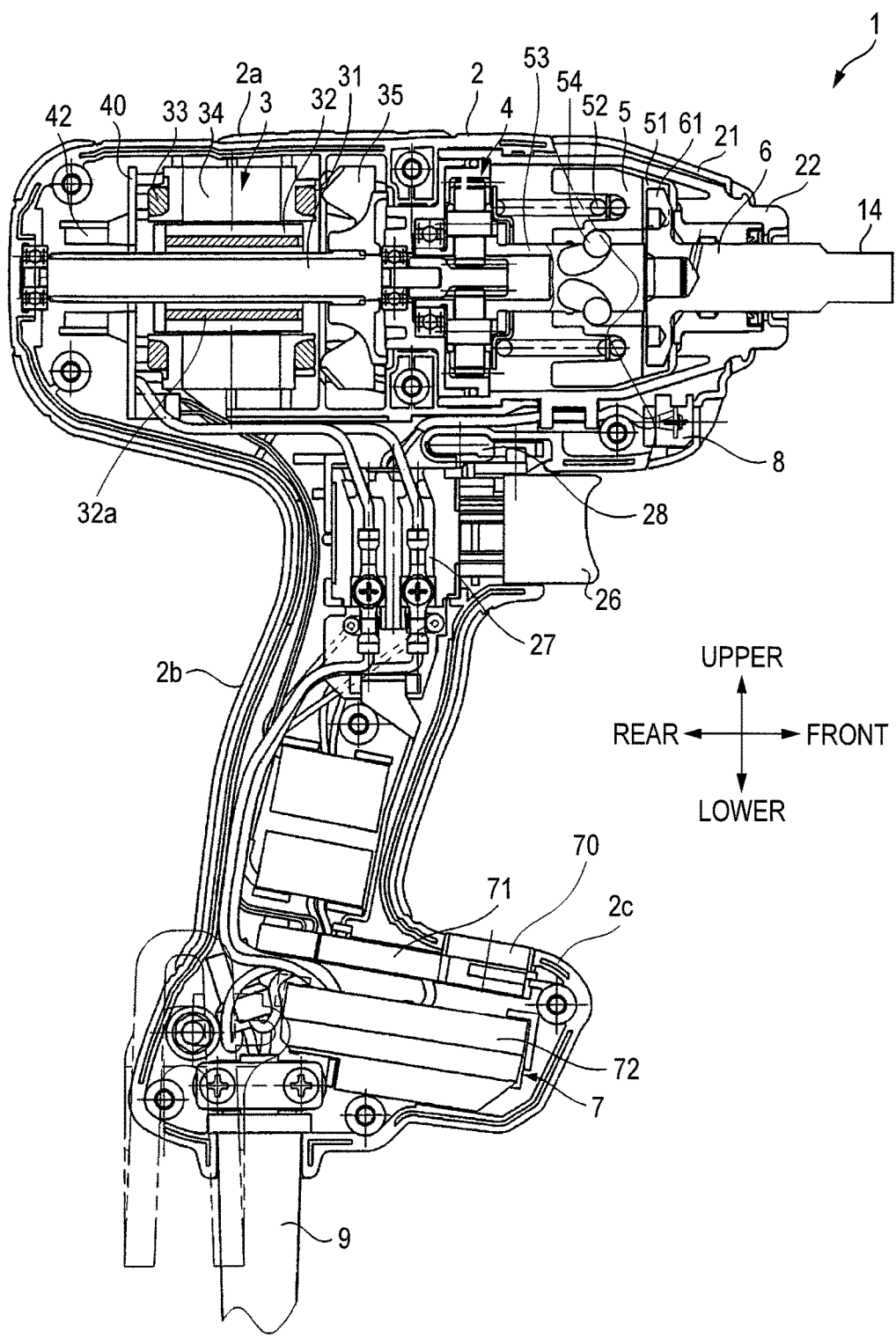
FIG. 1 is a longitudinal sectional view of an impact wrench according to an illustrative embodiment of the present invention.

Hereinafter, an illustrative embodiment of the present invention will be described with reference to the drawings. In the following drawings, an impact wrench is used as an example of an electric tool, the same components are denoted by the same reference numerals and a duplicated description thereof is omitted. Further, as used herein, an upper-lower direction, a left-right direction and a front-rear direction are described as directions shown in the drawings.

As shown in FIG. 1, an impact wrench 1 includes a housing 2, a motor 3, a deceleration mechanism 4, a hammer 5, an anvil 6, a light 8, a control unit 7 and a power supply cord 9. An end tool (not shown) is mounted to the anvil 6 that is an output shaft. FIG. 1 shows a mounting part 14 to which a hexagon socket as an end tool can be mounted. However, instead of the mounting part 14, a mounting hole and a mounting mechanism may be provided, to which a driver bit with a hexagonal cross-section or other end tools can be mounted in an one-touch method. The housing of the impact wrench 1 in a broad sense is configured by the resin housing 2 and a metal hammer case 22. The hammer case 22 is covered by a resin cover 21. The deceleration mechanism 4 and a striking mechanism are accommodated in the interior of the hammer case 22. A leading end of the anvil 6 is exposed to the outside from a through hole on a leading end side of the hammer case 22. The housing 2 is configured by three parts including a body part 2a, a handle part 2b and a board accommodating part 2c. The body part 2a has a substantially cylindrical shape. The handle part 2b is formed so as to extend in a substantially vertical direction from the body part 2a. The board accommodating part 2c is formed at a lower end portion (on a side apart from the body part 2a) of the handle part 2b. The motor 3, the deceleration mechanism 4, the hammer 5 and the anvil 6 are arranged in series in a rotation axis direction. Rotation of the motor 3 is transmitted to the end tool through the deceleration mechanism 4 and the striking mechanism having the hammer 5 and the anvil 6. In the present embodiment, an impact wrench including a power transmission mechanism is illustratively described as an example of the electric tool. The power transmission mechanism is composed of the deceleration mechanism 4 and the striking mechanism. However, the power transmission mechanism is not limited thereto, and the electric tool may use other power transmission mechanism or other end tool.

The handle part 2b is provided with a trigger 26. The trigger 26 is connected to a trigger switch 27 accommodated in the handle part 2b to set a rotation speed of the motor 3. A forward/reverse switching switch 28 (forward/reverse switching lever 10) is provided immediately above the trigger 26. The forward/reverse switching switch 28 is a connection portion of the handle part 2b and the body part 2a and switches the rotation direction of the motor 3. The light 8 is an LED (Light Emitting Diode). As a light button (not shown) or the trigger 26 is depressed, the light 8 is turned on. The light 8 illuminates the end tool and its surroundings. In this way, a worker can perform a work by using a bright light of the light 8 even in a dark place.

The control unit 7 is accommodated in the board accommodating part 2c and controls the rotation of the motor 3. The power supply cord 9 is extended at a lower side of the board accommodating part 2c and supplies power from the outside. An operation panel 70 is provided at an upper side of the board accommodating part 2c and sets the maximum rotation number of the motor in a plurality of levels. A worker can set the rotation number of the motor in three levels of low, middle and high levels by pressing a button (not shown) on the operation panel 70. The control unit 7 includes a control circuit board 71 and a power supply circuit board 72, which are mainly accommodated in the board accommodating part 2c. The control unit 7 controls the rotation speed of the motor 3 by adjusting the amount of power supplied to the motor 3 in accordance with an operation amount of the trigger 26. A diode bridge (not shown) is mounted on the power supply circuit board 72. The diode bridge rectifies and converts the commercial power supply into DC current (e.g., converts AC 100 V into DC 140 V).

The motor 3 is a brushless DC motor. The motor 3 includes an output shaft 31 extending in a longitudinal direction, a rotor 32 fixed to the output shaft 31 and having a plurality of magnets 32a, and a stator 34 disposed so as to surround the rotor 32 and having a plurality of coils (stator coils) 33. The motor 3 of the present embodiment is a 3-phase 4-pole 6-slot motor. However, the number of the poles and the number of the slots are not limited thereto. The brushless DC motor having other number of poles and slots may be used. A cooling fan 35 is provided at a front side of the motor 3 of the output shaft 31 and between the motor 3 and the deceleration mechanism 4. The cooling fan 35 receives air from an intake port 23a (see FIG. 2) by rotating in synchronization with the motor 3. The cooling fan 35 allows the air to pass through each part of the motor 3, thereby cooling each part. Then, the cooling fan 35 allows the air to be discharged to the outside from an exhaust port 23b (see FIG. 2) to be described later. A circuit board 40 is provided at a rear side in an axial direction of the motor 3. The circuit board 40 is provided for mounting an inverter in a direction substantially perpendicular to an axial direction of the output shaft 31. The circuit board 40 is a substantially circular double-sided board. The contour of the circuit board 40 is substantially the same as the contour of the motor 3. A switching element 42 made of a semiconductor such as a FET (Field Effect Transistor) or a position detection element (not shown) such as a hall IC is mounted on the circuit board.

The deceleration mechanism 4 is configured by a planetary gear mechanism having a plurality of gears. The deceleration mechanism 4 allows the rotation of the output shaft 31 to be decelerated at a predetermined reduction ratio and to be transmitted to a spindle 53. Here, the spindle 53 and the hammer 5 are connected to each other by a cam mechanism. The cam mechanism is configured by a V-shaped spindle cam groove formed in an outer peripheral surface of the spindle 53, a hammer cam groove formed in an inner peripheral surface of the hammer 5, and a ball 54 engaged with these cam grooves. The hammer 5 is rotated by the spindle 53 and provided at its front end with a colliding portion 51. The colliding portion 51 is projected axially forward in a convex shape. The anvil 6 is provided at its rear end with a collided portion 61. The collided portion 61 is extended radially in a concave shape. As the hammer 5 is rotated, the colliding portion 51 collides with the collided portion 61 in a rotation direction. The colliding portion 51 and the collided portion 61 are symmetrically formed at two locations on a rotation plane of the hammer 5 and the anvil 6, which are opposed to each other. The hammer 5 is always urged forward by a spring 52. During the stop of the hammer, the engagement of the ball 54 and the cam grooves allows the hammer 5 to be positioned at a position that is separated from an end surface of the collided portion 61 of the anvil 6 by a gap.

When the spindle 53 is rotationally driven, the rotation of the spindle 53 is transmitted to the hammer 5 through the cam mechanism. Until the hammer 5 is rotated a half turn, the colliding portion 51 of the hammer 5 is engaged with the collided portion 61 of the anvil 6 to rotate the anvil 6. When the relative rotation of the spindle 53 and the hammer 5 occurs by an engagement reaction force at that time, the hammer 5 starts to retreat toward the motor 3 while compressing the spring 52 along the spindle cam groove of the cam mechanism. Further, the retreat movement of the hammer 5 allows the colliding portion 51 of the hammer 5 to go beyond the collided portion 61 of the anvil 6 and thus the engagement between the hammer 5 and the anvil 6 is released. In this case, the hammer 5 is moved by an urging force of the spring 52 while being rapidly accelerated in a rotation direction and forward by the action of the cam mechanism and the elastic energy accumulated in the spring 52, in addition to the rotational force of the spindle 53. The colliding portion 51 of the hammer 5 is re-engaged with the collided portion 61 of the anvil 6, thereby starting to rotate integrally therewith. At this time, a strong rotary striking force is applied to the anvil 6. Accordingly, the strong rotary striking force is transmitted to an end tool (not shown) that is mounted to the mounting part 14 at a leading end of the anvil 6. Thereafter, the same operation is repeated, so that the rotary striking force is intermittently and repeatedly transmitted to a bolt or the like from the end tool. In this way, the bolt or the like is tightened.

Figure 2:
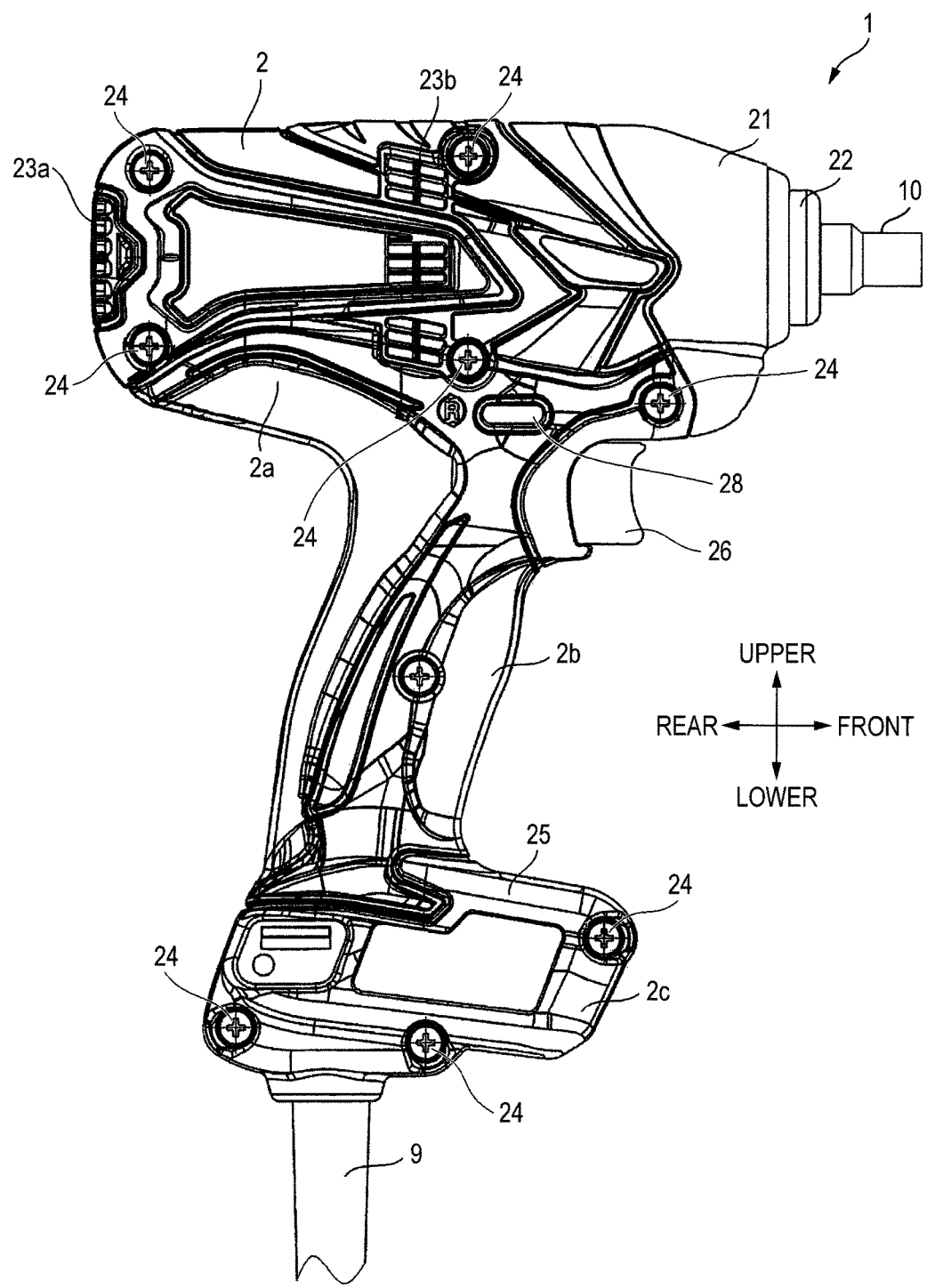
FIG. 2 is a side view of the impact wrench according to the illustrative embodiment of the present invention.

FIG. 2 is a side view showing an appearance of the impact wrench 1 according to the illustrative embodiment of the present invention. The housing 2 is configured by two split housings that can be provided at the left and right in the longitudinal direction. The left and right housings 2 are fixed to each other by a plurality of screws 24. A plurality of intake ports 23a for taking the outside air is formed at a rear end surface of the body part 2a. A plurality of exhaust ports 23b for discharging the outside air taken into the housing 2 is formed at both left and right sides of the body part 2a and in the vicinity of the peripheries of the cooling fan 35 (see FIG. 1).

Figure 3:
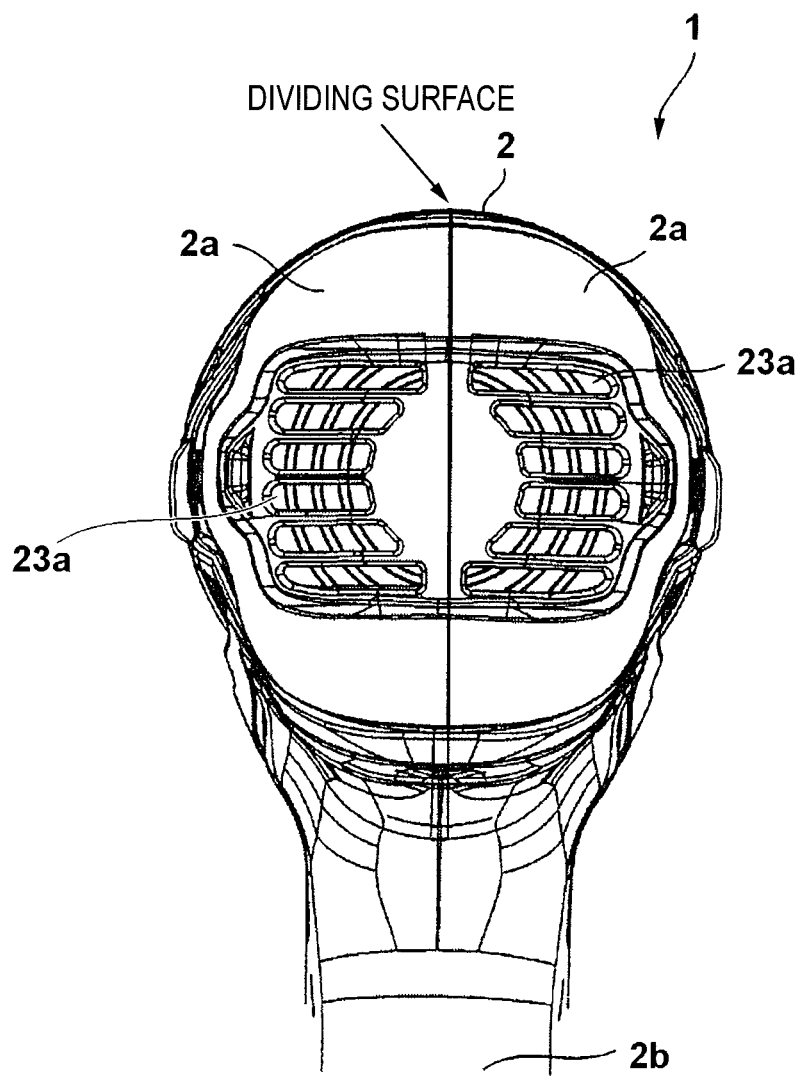
FIG. 3 is a partial rear view of the impact wrench according to the illustrative embodiment of the present invention.

FIG. 3 is a rear view of the impact wrench 1 according to the illustrative embodiment of the present invention. The intake ports 23a provided at the back side of the body part 2a are provided at the left and right housings 2, respectively. The intake ports 23a can be relatively large openings so as to take a sufficient amount of outside air. The shape of the body part 2a of the housing 2 is a cylindrical shape whose inner wall substantially conforms to an outer diameter of the motor 3. Below the body part 2a, the handle part 2b having a diameter smaller than that of the body part 2a is arranged so as to extend downward.

Figure 4:
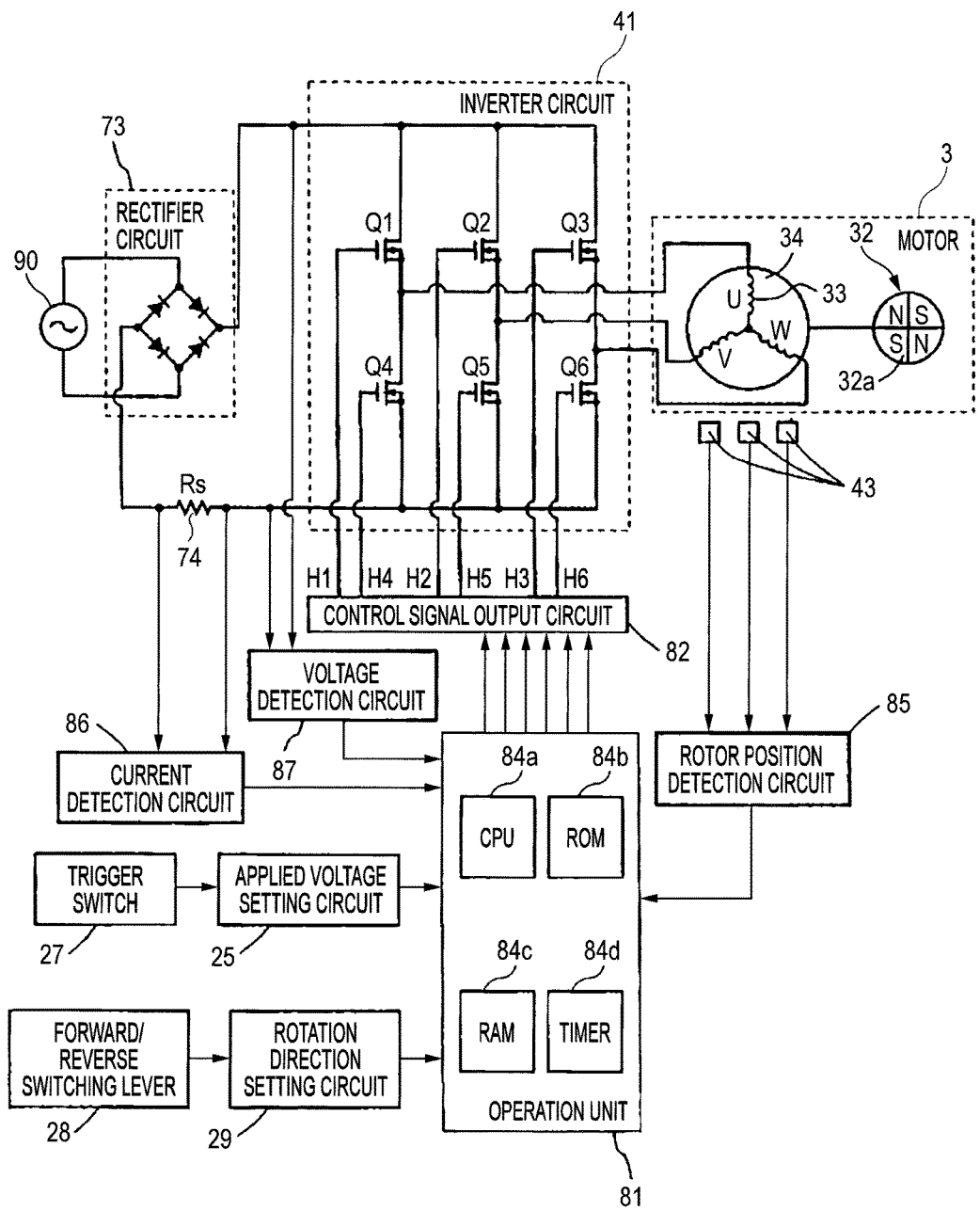
FIG. 4 is a block diagram showing a circuit configuration of a drive control system of a motor 3 in the impact wrench according to the illustrative embodiment of the present invention.

Next, a configuration and operation of a drive control system of the motor 3 will be described with reference to FIG. 4. FIG. 4 is a block diagram showing the configuration of the drive control system of the motor. In the present embodiment, the motor 3 is configured by a three-phase brushless DC motor. The motor 3 is a so-called inner rotor type and includes the rotor 32, three position detection elements 43 and the stator 34. The rotor 32 is configured by embedding the magnet 32*a* (permanent magnet) having a pair of N-pole and S-pole therein. The position detection elements 43 are arranged at an angle of every 60° so as to detect the rotation position of the rotor 32. The stator 34 is composed of star-connected three-phase windings U, V, W. The three-phase windings U, V, W are controlled at the current energization interval of 120° electrical angle on the basis of position detection signals from the position detection elements 43.

An inverter circuit 41 that is mounted on the circuit board 40 is mainly configured by six FETs (hereinafter, simply referred to as "transistor") Q1 to Q6 and a flywheel diode (not shown). The six FETs Q1 to Q6 are connected in three-phase bridge form. As an input power supply to the inverter circuit 41, the present embodiment uses direct current supplied from a rectifier circuit 73 where an AC power supply 90 is employed as a diode bridge. Typically, a smoothing capacitor or the like is used in the rectifier circuit 73 so as to reduce the ripple included in the output wave. However, in the present embodiment, the output of the rectifier circuit 73 is directly supplied to the inverter circuit 41 without interposing a capacitor. Of course, the smoothing capacitor may be used. Each gate of the six transistors Q1 to Q6 connected in the bridge type is connected to a control signal output circuit 82. Further, a source or drain of the six transistors Q1 to Q6 is connected to the star-connected armature windings U, V, W. Thereby, the six transistors Q1 to Q6 perform a switching operation by a switching element driving signal that is outputted from the control signal output circuit 82. The six transistors Q1 to Q6 supply power to the armature windings U, V, W by using DC voltage applied to the inverter circuit 41 as the three-phase (U-phase, V-phase, W-phase) AC voltages Vu, Vv, Vw.

A control circuit (controller) is mounted on the control circuit board 71. The control circuit is configured by an operation unit 81, a current detection circuit 86, a voltage detection circuit 87, an applied voltage setting circuit 25, a rotation direction setting circuit 29, a rotor position detection circuit 85, and the control signal output circuit 82, etc. The operation unit 81 includes a CPU 84*a* for outputting a drive signal based on a processing program and data, a ROM 84*b* for storing a control data or program corresponding to a flowchart (to be described later), a RAM 84*c* for temporarily storing data, and a timer 84*d*, etc. For example, the operation unit 81 can be realized by using a microcomputer where the above parts are incorporated. The current detection circuit 86 is a current detection means for detecting the current inputted to the inverter circuit 41 by measuring the voltage across a shunt resistor 74. The detected current is inputted to the operation unit 81. In this way, the operation unit 81 can monitor the value of current flowing through the motor 3. In the present embodiment, the shunt resistor 74 is provided between the rectifier circuit 73 and the inverter circuit 41, thereby detecting the value of current flowing through a semiconductor switching element. However, the shunt resistor 74 may be provided between the inverter circuit 41 and the motor 3, thereby directly detecting the current flowing through the motor 3.

The applied voltage setting circuit 25 inputs a predetermined voltage to the operation unit 81, in response to a movement stroke of the trigger 26. The operation unit 81 sets the voltage applied to the motor 3, that is, a duty ratio of PWM signal, in accordance with the predetermined voltage. The rotation direction setting circuit 29 is a circuit for setting the rotation direction of the motor 3 by detecting a forward rotation operation or a reverse rotation operation by the forward/reverse switching lever 10 (forward/reverse switching switch 28) of the motor 3. The rotor position detection circuit 85 is a circuit for detecting a positional relationship between the rotor 32 and the armature windings U, V, W of the stator 34 based on output signals of the three position detection elements 43. The control signal output circuit 82 supplies PWM signal to the transistors Q1 to Q6 based on the output from the operation unit 81. The power supplied to each of the armature windings U, V, W is adjusted by the control of a pulse width of the PWM signal, so that the rotation number of the motor 3 in the rotation direction set can be controlled. Although not shown in FIG. 4, an output signal of a rotation setting switch of the motor 3 is inputted to the operation unit 81 and adapted to switch a torque value (or the rotation number of the motor). The operation unit 81 serves as a rotational speed setting unit for setting the maximum rotation number of the motor 3 in accordance with the output signal. This refers to the following control method. Specifically, in a case where an initial duty ratio D0 is set to 86%, the duty ratio of the motor 3 is controlled in 0 to 86% during the rotation number of "high level," the duty ratio of the motor 3 is controlled in 0 to 66% during the rotation number of "middle level," and the duty ratio of the motor 3 is controlled in 0 to 46% during the rotation number of "low level." Further, although not shown in FIG. 4, a lighting circuit is connected to the operation unit 81 to control the lighting of the light 8 by an LED or the like for illuminating the vicinity of the end tool.

Next, a rotation control procedure of the motor 3 according to the illustrative embodiment of the present invention will be described with reference to FIG. 5A, 5B and FIG. 6. The most essential feature of the present embodiment is that a high-output motor capable of achieving higher rotation number and torque than the rated output required is used as the motor 3, and in a case where the power supply voltage is a rated value, even at the maximum output setting of the electric tool, an operation is carried out in a state of suppressing the output of the high-output motor. FIGS. 5A and 5B are diagrams for explaining a relationship between a duty ratio (reference duty ratio), and no-load input voltage V0 and load voltage V1. The duty ratio is set and used for the rotation control of the motor 3. The operation unit 81 respectively measures the no-load input voltage V0 immediately before the pulling of the trigger 26 (or, from the pulling of the trigger 26 to the start of the motor 3) and the load voltage V1 after the start of the motor 3, by using the voltage detection circuit 87. FIG. 5A is a diagram showing a relationship between the no-load input voltage V0 and the initial duty ratio D0. Here, "the duty ratio" refers to a ratio of a period of a pulse wave and a pulse width in a PWM (Pulse Width Modulation) control. The PWM control performs modulation by changing the duty ratio of a pulse wave supplied to the motor 3. Normally, the duty ratio D can be represented by D=τ/T (here, τ: pulse width, T: period). In a general electric tool, when the electric tool is operated at the maximum output by using the rated AC power supply, the motor 3 is driven in the duty ratio of 100%, i.e., the motor 3 is operated without a pulse modulation. Therefore, the type of the motor 3 to be used is selected to suit the rated power supply and the required rated output. However, in the present embodiment, the motor 3 to be used has a characteristic that the motor is operated in the reference duty ratio D of about 86% during the rated voltage. This means that the motor becomes overspeed and cannot withstand thermally when the motor 3 is driven in the duty ratio D of 100% at the rated voltage. In order to achieve such a motor characteristic, it is sufficient that the windings of the coil of the motor 3 are reduced and a thick winding is used to allow a large current. Therefore, it does not lead to the large size of the motor 3 itself and cost increase.

Figure 10:
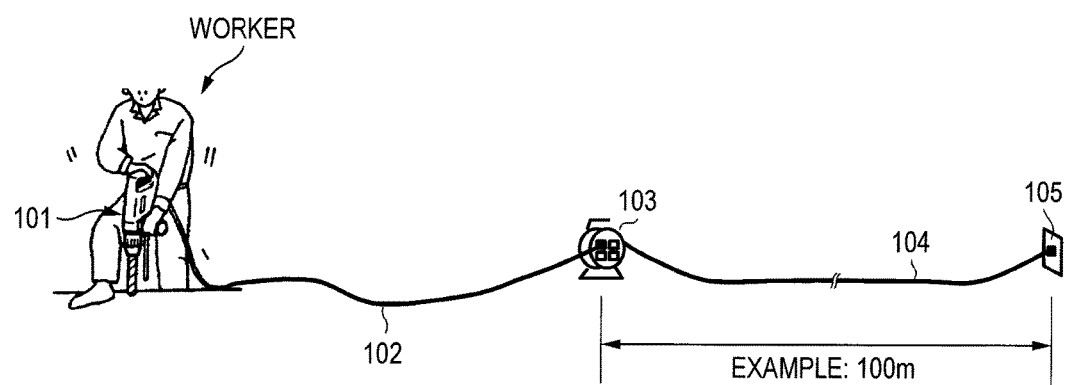
FIG. 10 is a view for explaining an example of the usage of an electric tool.

In the present embodiment, in the impact wrench 1 of rated voltage alternating current 230 V (60 Hz), as shown in FIG. 5A, the duty ratio (initial duty ratio) D0 in the initial setting is set to 86% when the measured no-load input voltage V0 is equal to or greater than 225 V. The duty ratio (initial duty ratio) D0 in the initial setting is set to 88% when the no-load input voltage V0 is less than 225 V. In this way, the motor 3 is started. Large current flows through the motor 3 when the motor 3 is started. Accordingly, the voltage drop occurs when the extension cord 104 shown in FIG. 10 is used or when the power supply voltage is not stable. In the present embodiment, the power supply voltage after the start of the motor 3 (load voltage V1) is measured and the duty ratio D1 during the rotation is adjusted in accordance with the load voltage V1. FIG. 5B shows an example thereof. When the load voltage V1 is equal to or greater than 225 V, the duty ratio D1 is still 86%. When the load voltage V1 is equal to or greater than 220 V but less than 225 V, the duty ratio D1 becomes 88%. When the load voltage V1 is less than 220 V, the duty ratio D1 becomes 90%. In order to change the duty ratios D0, D1 in accordance with the no-load input voltage V0 and the load voltage V1 in this way, the combinations thereof are previously stored as parameters in the ROM 84b of the operation unit 81 and the motor 3 is controlled by using the parameters, so that it is possible to supplement the output reduction of the impact wrench 1 due to the variation of the AC voltage. Here, 225 V may be set based on a predetermined range including the rated voltage 230 V. In the present embodiment, it is determined whether or not the load voltage is equal to or greater than 225 V based on the range of ±5 V from the rated voltage 230 V. However, the value of the reference voltage may be set as appropriate.

Figure 6:
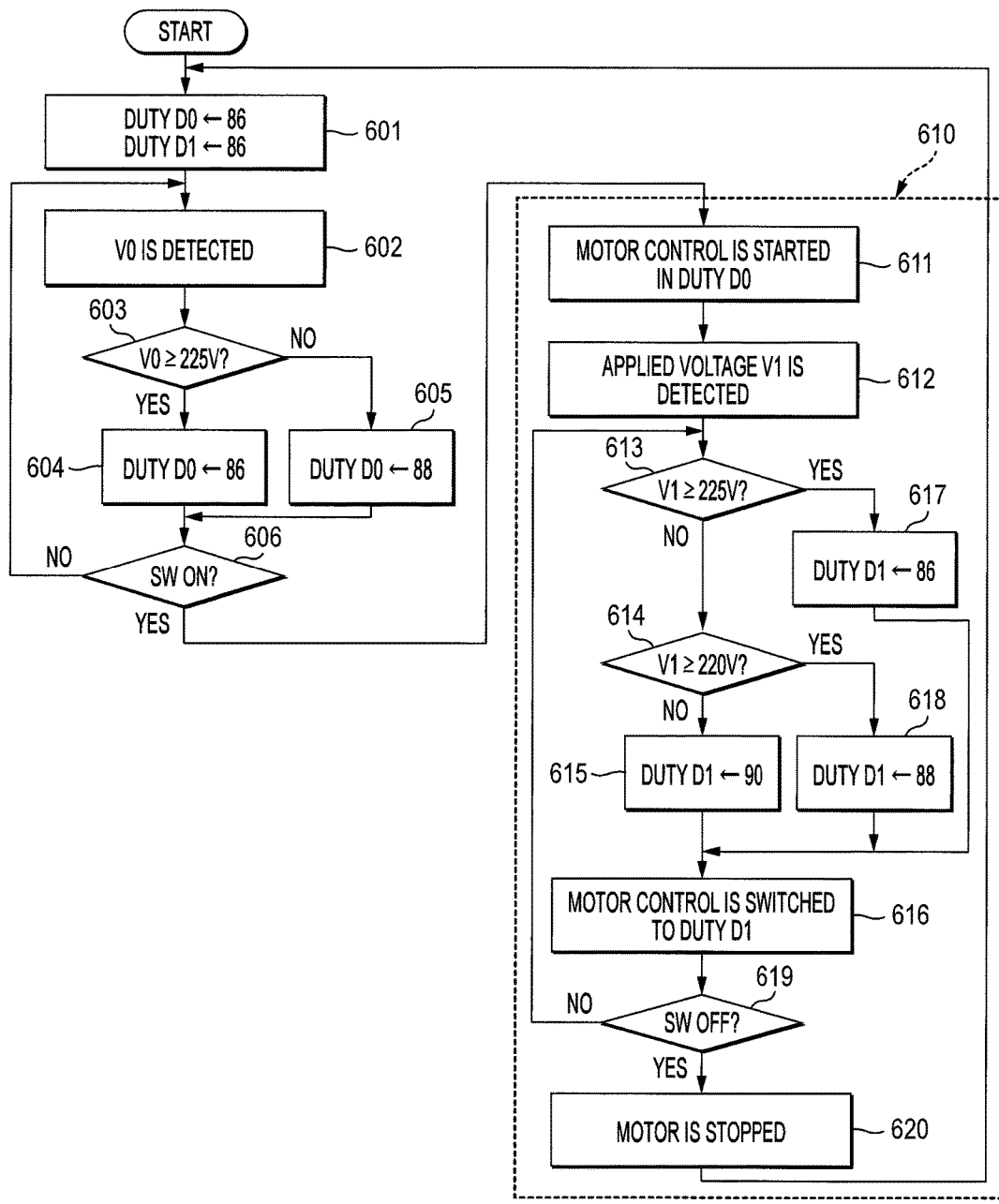
FIG. 6 is a flowchart for explaining a rotation control procedure of the motor according to the illustrative embodiment of the present invention.

FIG. 6 is a flowchart for explaining a rotation control procedure of the motor according to the illustrative embodiment of the present invention. This flowchart is started when the power supply cord 9 of the impact wrench 1 is connected to the socket 105 or the cord reel 103 and the microcomputer included in the operation unit 81 is thus activated. A computer program that is previously stored in the ROM 84b is executed by the CPU 84a, so that a series of steps shown in FIG. 6 can be realized through software. First, as an initial setting after the power supply is turned on, the operation unit 81 sets the values of the initial duty ratio D0 and the load duty ratio D1 to 86% (Step 601). Subsequently, the operation unit 81 detects the no-load input voltage V0 from the output of the voltage detection circuit 87 (Step 602). Subsequently, the operation unit 81 determines whether or not the no-load input voltage V0 measured is equal to or greater than 225 V (Step 603). Here, when it is determined that the no-load input voltage V0 is equal to or greater than 225 V, the operation unit 81 sets the duty ratio D0 in the initial setting to 86% by using the values stored in the table of FIG. 5A (Step 604). When it is determined that the no-load input voltage V0 is less than 225 V, the operation unit 81 sets the duty ratio D0 in the initial setting to 88% (Step 605).

Subsequently, the operation unit 81 detects whether or not the trigger 26 is pulled by a worker (Step 606). When it is detected that the trigger 26 is not pulled, the procedure returns to Step 602. When it is detected in Step 606 that the trigger 26 is pulled, the motor 3 starts to rotate (Step 611). In the trigger switch 27 of the present embodiment, a variable switch is used and the rotation number of the motor 3 is changed in proportional to the pulled amount of the trigger. Accordingly, the duty ratio D0 set has a value (maximum value) when the trigger 26 is pulled to the maximum. When the pulled amount of the trigger 26 is small, for example, when the trigger 26 is pulled about a half, the operation unit 81 sets the duty ratio in accordance with the pulled state of the trigger. For example, the operation unit 81 adjusts the duty ratio within the range of 0 to 86%. Meanwhile, in the case of the electric tool where the trigger 26 is not a variable capacitance switch but an ON/OFF switch, the electric tool is driven in the duty ratio D0 set when the trigger switch is turned on.

Next, once the motor 3 is activated, the operation unit 81 detects the load voltage V1 at that time from the output of the voltage detection circuit 87 (Step 612). Subsequently, the operation unit 81 determines whether or not the detected load voltage V1 is equal to or greater than 225 V (Step 613). When it is determined that the load voltage V1 is equal to or greater than 225 V, the operation unit 81 resets the duty ratio D1 during the rotation to 86% and the procedure proceeds to Step 616 (Step 617). When it is determined in Step 613 that the load voltage V1 is less than 225 V, the operation unit 81 determines whether or not the load voltage V1 is equal to or greater than 220 V (Step 614). When it is determined that the load voltage V1 is equal to or greater than 220 V, the operation unit 81 resets the duty ratio D1 during the rotation to 88% and the procedure proceeds to Step 616 (Step 618). When it is determined in Step 614 that the load voltage V1 is less than 220 V, the operation unit 81 resets the duty ratio D1 during the rotation to 90% and the procedure proceeds to Step 616 (Step 615). The operation unit 81 switches the duty ratio D1 to the reset value and resumes the rotation control of the motor (Step 616). When the trigger switch 27 is still turned on, the procedure returns to Step 613 (Step 616). When the trigger switch 27 is turned off, the motor is stopped and the procedure returns to Step 601 (Step 620).

By the above procedures, the operation unit 81 performs the rotation control of the motor 3 in the range of 86 to 90% of the maximum value of the duty ratio. Even when the AC power supply supplied to the impact wrench 1 drops below the rated value by performing the control in this way, the output is compensated by increasing the duty ratio of the motor 3 to be controlled and therefore the rated output of the impact wrench 1 can be secured. In the present embodiment, the maximum value of the duty ratio is varied in the range of 86 to 90%. However, in the case where the range is controlled in the range of 86 to 100%, it is possible to maintain the rated output even when the voltage to be supplied drops to about 200V. Further, instead of driving the motor 3 while adjusting the duty ratio D1 determined by using the voltage V1 measured immediately after the pulling of the trigger 26 until the trigger 26 is returned, the operation unit 81 may be configured so that the procedure does not return to Step 613 in Step 619 but is in a standby state. In this way, the duty ratio D0 is not be switched while the electric tool is operated.

Second Embodiment

Figure 7:
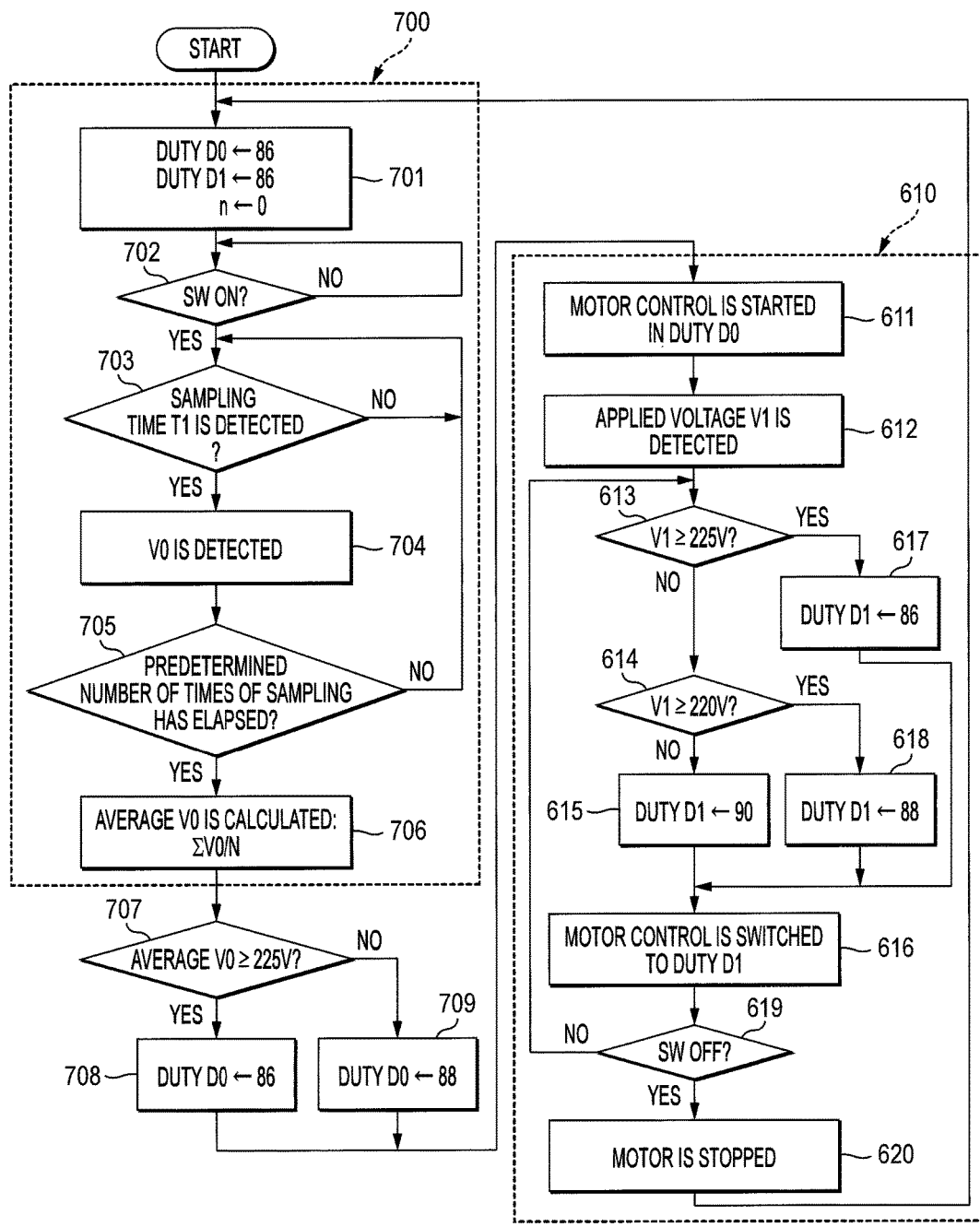
FIG. 7 is a flowchart for explaining a rotation control procedure of a motor according to a second embodiment of the present invention.

Next, a rotation control procedure of a motor according to a second embodiment of the present invention will be described with reference to the flowchart of FIG. 7. The basic control procedure in the second embodiment is the same as in the first embodiment. However, the measuring procedure for the no-load input voltage V0 in the second embodiment is different from the first embodiment. That is, instead of periodically measuring the no-load input voltage V0 when the power supply voltage is connected, the no-load input voltage V0 is measured for a short time immediately after the pulling of the trigger and before the rotation start of the motor 3. Here, a state of the motor 3 before the start refers to a state before current flows through the motor 3 and a state of the motor 3 after the start refers to a state where current flows through the motor 3. First, the power supply cord 9 of the impact wrench 1 is connected to the socket 105 or the cord reel 103, so that the microcomputer included in the operation unit 81 is started. Further, as an initial setting, the values of the initial duty ratio D0 and the load duty ratio D1 are set to 86% (Step 701). Further, the value of the counter n for the measurement of the number of times of sampling is cleared to zero. Subsequently, the operation unit 81 determines whether or not the trigger switch 27 is turned on. When it is determined that the trigger switch is turned on, the procedure proceeds to Step 703. When it is determined that the trigger switch is not turned on, the procedure is in a standby state (Step 702). In Step 703, it is determined whether or not a sampling time T1 has elapsed after the turn on of the trigger switch 27 or from the time previously measured. The procedure is in a standby state until the sampling time T1 has elapsed (Step 703). When the sampling time T1 has elapsed, the operation unit 81 measures the no-load input voltage V0 and adds the value of the counter n (Step 704). Subsequently, the operation unit 81 determines whether or not the number n of times of sampling reaches a predetermined value. When it is determined that the number n of times of sampling does not reach the predetermined value, the procedure returns to Step 703 (Step 705). When the number n of times of sampling is equal to N in Step 705, the operation unit 81 calculates an average value of the no-load input voltage V0 that is measured by N times (Step 706). As such, in the second embodiment, the no-load input voltage V0 is measured by a predetermined number of times of sampling and then the average voltage is calculated. In this way, the influence of the voltage variation or noise, etc., can be effectively prevented, so that the measurement accuracy can be improved. In addition, a method of using a peak voltage (highest value) may be used as a method of calculating the no-load input voltage V0. A method of calculating an average value from the data excluding the highest and lowest values may be used or other calculation methods may be used.

Next, the operation unit 81 determines whether or not the measured no-load input voltage V0 is equal to or greater than 225 V (Step 707). When it is determined that the no-load input voltage V0 is equal to or greater than 225 V, the operation unit 81 sets the duty ratio D0 in the initial setting to 86% by using the values stored in the table of FIG. 5A (Step 708). When it is determined that the no-load input voltage V0 is less than 225 V, the operation unit 81 sets the duty ratio D0 in the initial setting to 88% (Step 709). Subsequent procedures are the same as a step group 610 (Steps 611 to 620) shown in FIG. 6 and a duplicated description thereof is thus omitted. According to the second embodiment, the no-load input voltage V0 is measured immediately after the pulling of the trigger and before the start of the motor, so that it is possible to accurately carry out the voltage measurement. Further, the motor 3 can be started in a suitable duty ratio and excessive voltage can be prevented from being applied to the motor 3.

Third Embodiment

Figure 8:
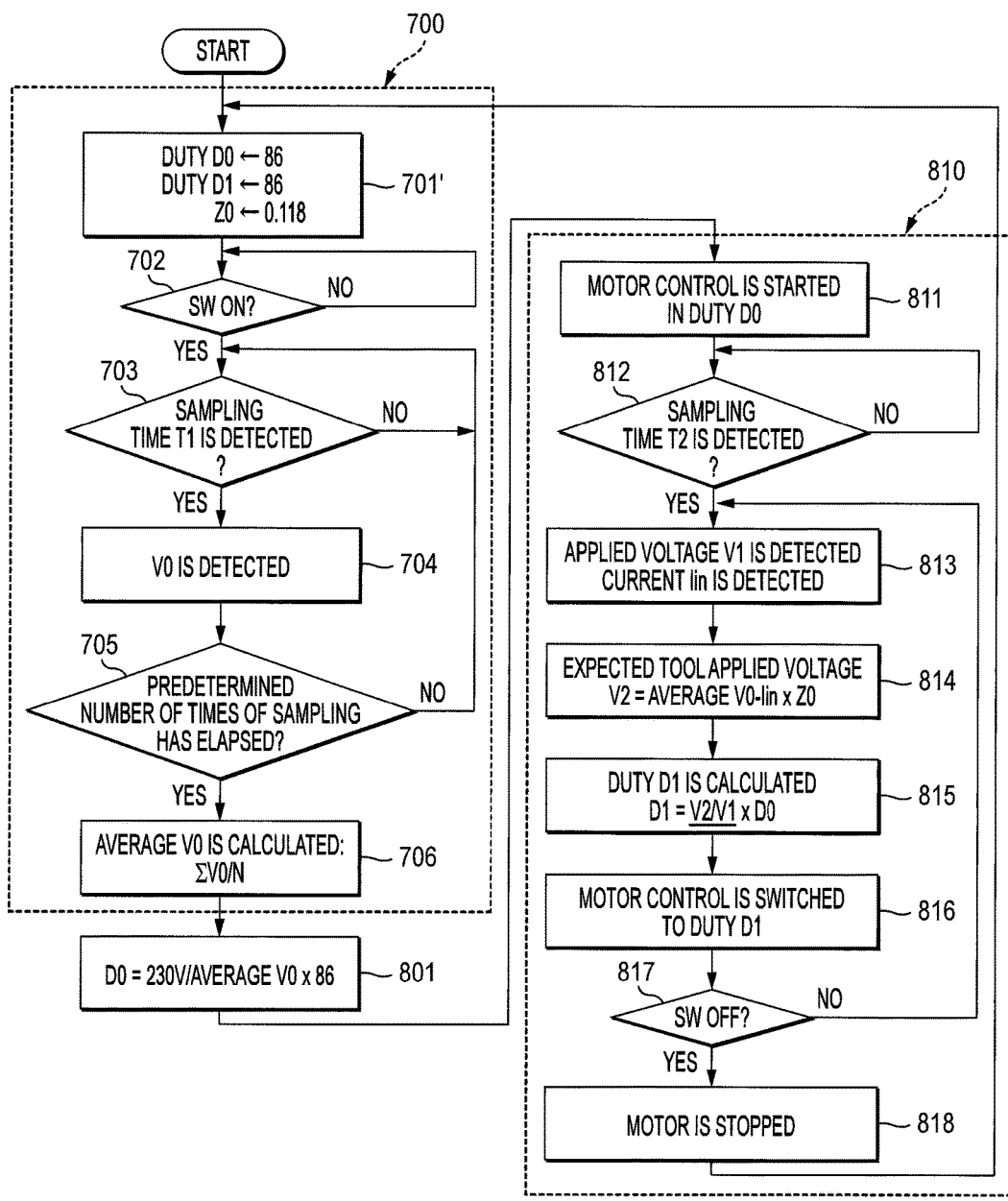
FIG. 8 is a flowchart for explaining a rotation control procedure of a motor according to a third embodiment of the present invention.

Next, a rotation control procedure of a motor according to a third embodiment of the present invention will be described with reference to the flowchart of FIG. 8. As shown by a step group 700, the control before the start of the motor in the third embodiment is the same as in the second embodiment. However, in Step 701' of the third embodiment, an operation of assigning 0.118(Ω) to Z is executed, as an impedance value Z0 for computing the voltage drop of the extension cord. This value may be previously stored in the ROM 84b of the operation unit 81. The other steps are the same as the steps 702 to 706 in the second embodiment and a duplicated description thereof is thus omitted. When the average value of the no-load input voltage V0 sampled by the number of N times after the pulling of the trigger is calculated by the step group 700, the duty ratio D0 (%) is computed by using the formula (1) (Step 801).

$$D0=230/(\text{average } V0 \text{ value})\times 86 \quad \text{(formula 1)}$$

(Here, D0=100 when the computed value of the duty ratio D0 exceeds 100)

Since the duty ratio is calculated by the equation in this way, it is possible to finely respond to the voltage variation. Accordingly, the motor 3 can be started in an optimal duty ratio D0, compared to the first and second embodiments.

Next, the rotation of the motor 3 is started as a worker pulls the trigger 26 (Step 811). Subsequently, the operation unit 81 detects the load voltage V1 at that time from the output of the voltage detection circuit 87 when the motor 3 is activated. However, in order to perform the detection at timing when a predetermined time T2 has elapsed from the start of the motor, the operation unit 81 is in a standby state until the predetermined time T2 has elapsed (Step 812). For example, the predetermined time T2 may be about 10 ms. When the predetermined time T2 has elapsed from the start of the motor 3, the operation unit 81 detects the load voltage V1 at that time from the output of the voltage detection circuit 87 and simultaneously detects the current $L_n$ at that time from the output of the current detection circuit 86 (Step 813). Subsequently, the operation unit 81 calculates an expected tool applied voltage V2 applied to the electric tool by using the formula (2) (Step 814).

$$V2=(\text{average } V0 \text{ value})-I_{in}\times Z0 \quad \text{(formula 2)}$$

Subsequently, the operation unit 81 calculates the duty ratio D1 by using the calculated V2 by the formula (3) (Step 815).

$$D1=V2/V1\times D0 \quad \text{(formula 3)}$$

The operation unit 81 switches the duty ratio to the duty ratio D1 obtained by the calculation to continuously perform the rotation control of the motor (Step 816). The operation unit 81 causes the procedure to return to Step 813 when the trigger switch 27 is still turned on (Step 817). The operation unit 81 stops the motor and then causes the procedure to return to Step 701' when the trigger switch 27 is turned off (Step 818).

According to the third embodiment, the no-load input voltage V0 is measured immediately after the pulling of the trigger and before the start of the motor, so that it is possible to accurately carry out the voltage measurement. Accordingly, the motor 3 can be started in a suitable duty ratio. Furthermore, immediately after the start of the motor 3, the expected tool applied voltage V2 is calculated in consideration of the voltage drop situation of the power supply cord. Then, the optimal duty ratio D1 is set on the basis of the expected tool applied voltage V2. The motor 3 can be optimally controlled and operated at constant output even in a poor environment where the voltage drop is large.

In Step 815, a PID control may be executed by using a transfer function G. In this case, the proportional gain Kp is equal to V2/V1 and the transfer function G is calculated from the following formula (4).

$$G=Kp(1+1/T_{is}+T_{ds}) \tag{formula 4}$$

Here, $T_{is}$(sec): Integration time
$T_{ds}$(sec): Derivative time

Here, the integration time and the derivative time are parameters and set to suit the actual operation of the motor. Then, D1 is calculated from D1=G×D0 and the motor control is performed.

Fourth Embodiment

Figure 9:
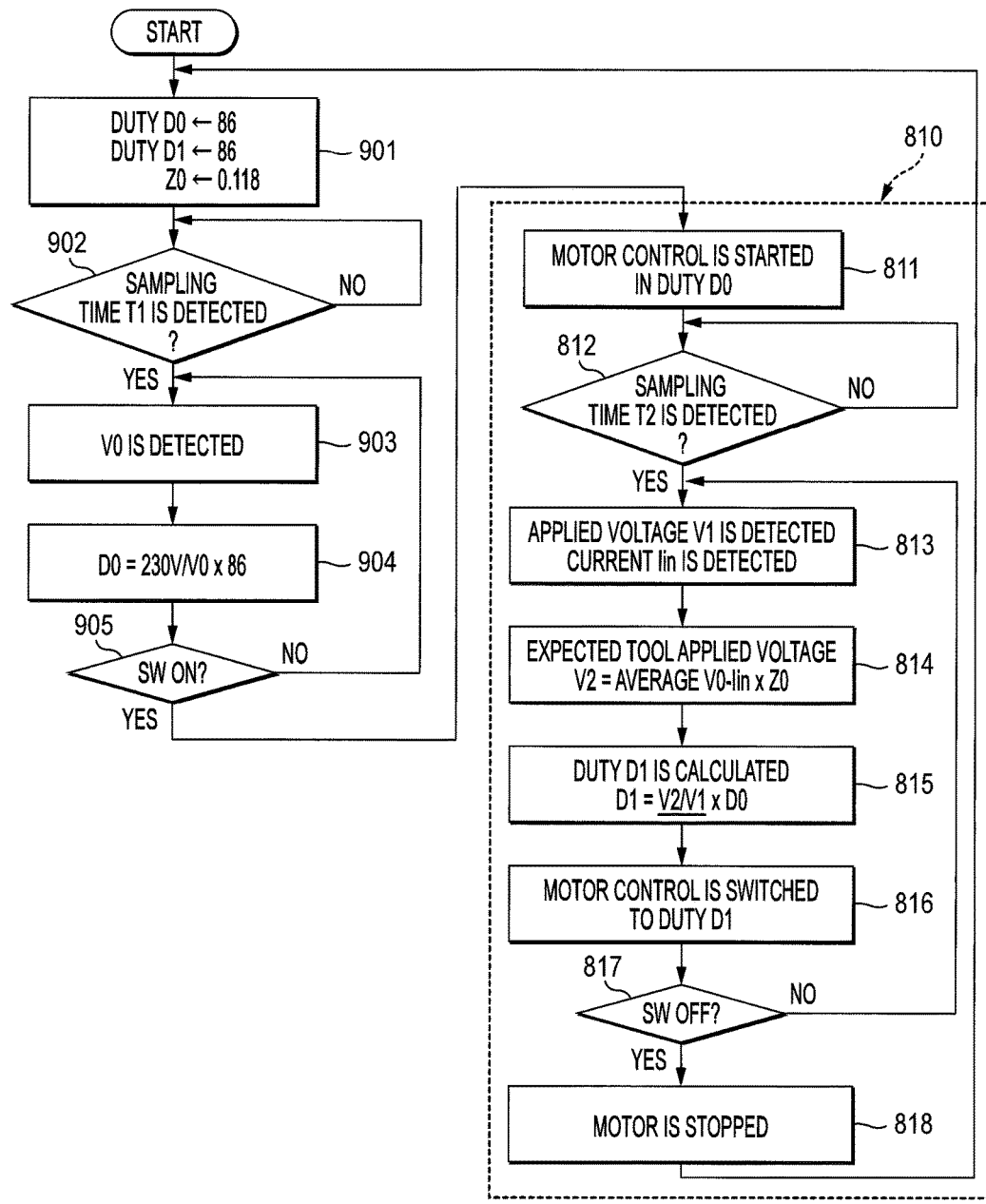
FIG. 9 is a flowchart for explaining a rotation control procedure of a motor according to a fourth embodiment of the present invention.

Next, a rotation control procedure of a motor according to a fourth embodiment of the present invention will be described with reference to the flowchart of FIG. 9. The control for the steps (step group 810) after the start of the motor 3 in the fourth embodiment is the same as in the third embodiment. However, the control before the start of the motor 3 in the fourth embodiment is different from the control in the third embodiment. First, the power supply cord 9 of the impact wrench 1 is connected to the socket 105 or the cord reel 103, so that the microcomputer included in the operation unit 81 is started. Further, as an initial setting, the values of the initial duty ratio D0 and the load duty ratio D1 are set to 86%. Simultaneously, as an impedance value Z0 for computing the voltage drop of the extension cord, 0.118(Ω) is assigned to Z (Step 901). The initial values of these parameters may be previously stored in the ROM 84b of the operation unit 81. Subsequently, in order to measure the no-load input voltage V0 at timing when a predetermined time T1 has elapsed from the start of the microcomputer, the operation unit 81 is in a standby state until the predetermined time T1 has elapsed (Step 902). Subsequently, the operation unit 81 detects the no-load input voltage V0 at that time from the output of the voltage detection circuit 87 when the predetermined time T1 has elapsed (Step 903). Then, the operation unit 81 calculates the duty ratio D0 in the initial setting from the formula (5) (Step 904).

$$D0=230/V0\times 86 \tag{formula 5}$$

When the calculation is completed, the operation unit 81 detects whether or not the trigger switch 27 is turned on. When it is detected that the trigger switch 27 is turned on, the procedure proceeds to step group 810. When it is detected that the trigger switch 27 is still turned off, the procedure returns to Step 903. Control procedures in the step group 810 are the same as in the third embodiment shown in FIG. 8 and a duplicated description thereof is thus omitted.

As such, in the fourth embodiment, the measuring procedure for the no-load input voltage V0 is simplified compared to the third embodiment. Further, in the control after the start of the motor 3, the duty ratio D1 is finely controlled. Accordingly, the electric tool such as the impact wrench can be stably used in a stable state even in an environment where the power supply voltage is unstable and the voltage variation is large.

Hereinabove, the present invention has been described with reference to the illustrative embodiments. However, the present invention is not limited to the above-described illustrative embodiments but can be variously modified without departing from the gist of the present invention. For example, in the above-described illustrative embodiments, an electric tool to which a commercial power supply is supplied from the outside by a power supply cord has been illustratively described. However, the present invention can be similarly applied to an electric tool to which direct current is supplied from the outside or a battery. Further, in the electric tool of the above-described illustrative embodiments, the impact wrench has been illustratively described. However, the present invention is not limited to the impact wrench but can be similarly applied to an impact driver, a driver drill, an electric circular saw, a hammer drill or any other electric tool using a motor as a power source.

This application claims priority from Japanese Patent Application No. 2014-070587 filed on Mar. 28, 2014, the entire contents of which are incorporated herein by reference.

INDUSTRIAL APPLICABILITY

According to an aspect of the invention, there is provided an electric tool that is capable of maintaining the rated output even when the voltage variation in the power inputted to the electric tool occurs to some extent.

What is claimed is:

1. An electric tool comprising:
   a housing;
   a power supply cord that extends from the housing and is configured to be connected to an external power supply;
   a motor configured to be driven by a PWM control of a semiconductor switching element by using power supplied from the external power supply via the power supply cord;
   a power transmission mechanism configured to transmit a rotation of the motor to an end tool so as to drive the end tool; and
   a controller configured to control a rotation of the motor by a duty ratio of the PWM control,
   wherein, the controller is further configured such that when a voltage drop due to usage of an extension cord occurs, the controller drives the motor by setting the duty ratio to be higher than a duty ratio which is set when the power is supplied from the external power supply via only the power supply cord,
   wherein an initial duty ratio is less than 90%, and
   wherein the controller drives the motor by increasing the duty ratio when the voltage of the power supply applied to the electric tool is lower than the rated voltage, the upper limit of the increased duty ratio being 100%.

2. The electric tool according to claim 1,
   wherein the power supply is an AC power supply supplied from the outside through the power supply cord,
   wherein a rectifier circuit configured to rectify the AC power supply is provided in a housing of the electric tool, and
   wherein a brushless motor configured to be driven by using an inverter circuit is used as the motor.

3. The electric tool according to claim 1, further comprising:
   a trigger for rotating the motor,
   wherein the controller sets the duty ratio to be higher than the initial duty ratio when there is a potential difference between a first voltage of the power supply applied to the electric tool immediately after the trigger has been pulled and a second voltage of the power supply applied to the electric tool after the start of the motor.

4. The electric tool according to claim 3, wherein the controller determines the duty ratio from the second voltage within a predetermined time immediately after the trigger has been pulled.

5. The electric tool according to claim 4, wherein the controller drives the motor by increasing the duty ratio when the second voltage has decreased during the rotation of the motor.

6. The electric tool according to claim 4, wherein the controller drives the motor in a state where the duty ratio, which has been determined by using the second voltage immediately after the pulling of the trigger, is fixed until the trigger is returned.

7. The electric tool according to claim 1, further comprising a rotation number setting unit configured to set a maximum rotation number of the motor to a plurality of levels,
wherein the duty ratio is set to a plurality of steps within a range between 0 and the initial duty ratio, in proportion to the set levels of the rotation number.

8. The electric tool according to claim 1:
wherein the controller is configured to set the duty ratio immediately after pulling a trigger for rotating the motor to be less than 100%, and
wherein the controller is configured to increase the duty ratio when a voltage of the power supply applied to the electric tool after the start of the motor becomes lower than a rated voltage of the electric tool by a voltage drop which occurs due to the power supply cord.

9. The electric tool according to claim 1:
wherein the controller is configured to set the duty ratio before the start of the motor to be less than 100%, and
wherein the controller is configured to drive the motor in a duty ratio higher than a previous duty ratio when a voltage of the power supply applied to the electric tool after the start of the motor becomes lower than a voltage of the power supply before the start of the motor by a voltage drop which occurs due to the power supply cord.

10. The electric tool according to claim 9, wherein a state of the motor before the start refers to a state before current flows through the motor, and a state of the motor after the start refers to a state where current flows through the motor.

11. An electric tool comprising:
a housing;
a power supply cord that extends from the housing and is configured to be connected to an external power supply;
a motor configured to be driven by a PWM control of a semiconductor switching element by using power supplied from the external power supply via the power supply cord;
a power transmission mechanism configured to transmit a rotation of the motor to an end tool so as to drive the end tool; and
a controller configured to control a rotation of the motor by a duty ratio of the PWM control,
wherein, when a predetermined time has passed from the start of the motor, in a case where an extension cord is connected between the power supply cord and the external power supply and the power is supplied from the external power supply via the power supply cord and the extension cord, the controller is configured to drive the motor by setting the duty ratio to be higher than a duty ratio which is set when the power is supplied from the external power supply via only the power supply cord,
wherein an initial duty ratio is less than 90%, and
wherein the controller drives the motor by increasing the duty ratio when the voltage of the power supply applied to the electric tool is lower than the rated voltage, the upper limit of the increased duty ratio being 100%.

* * * * *